Oct. 11, 1932.   A. JAUMANN   1,882,631
ELECTRIC FILTER ARRANGEMENT
Filed Sept. 2, 1930   5 Sheets-Sheet 1

Inventor:
Andreas Jaumann
by Lotka & Kehlenbeck
Attorneys.

Oct. 11, 1932.  A. JAUMANN  1,882,631
ELECTRIC FILTER ARRANGEMENT
Filed Sept. 2, 1930  5 Sheets-Sheet 2

Inventor:
Andreas Jaumann
by Lorra & Kehlenbeck
Attorneys

Inventor:
Andreas Jaumann
by Lotka Nehlenbeck
Attorneys

Oct. 11, 1932.    A. JAUMANN    1,882,631
ELECTRIC FILTER ARRANGEMENT
Filed Sept. 2, 1930    5 Sheets-Sheet 4

Inventor:
Andreas Jaumann
by Lowe & Kehlenbeck
Attorneys

Patented Oct. 11, 1932

1,882,631

UNITED STATES PATENT OFFICE

ANDREAS JAUMANN, OF BERLIN-CHARLOTTENBURG, GERMANY, ASSIGNOR TO SIEMENS & HALSKE AKTIENGESELLSCHAFT, OF SIEMENSSTADT, NEAR BERLIN, GERMANY, A CORPORATION OF GERMANY

ELECTRIC FILTER ARRANGEMENT

Application filed September 2, 1930, Serial No. 479,285, and in Germany August 31, 1929.

This invention relates to an electric filter arrangement, more particularly in the form of a separating filter arrangement.

The object of the invention is to provide a new type of wave filter which is distinguished by a particular steepness of the attenuation rise at the limits of the transmission range and in certain constructions is particularly suitable for such separating filters due to the fact that certain switch members in filters appertaining to different channels can be combined.

A further object of the invention is the use of the said separating filters in a multi-transmission system.

Electric filters with a limited transmission range and steep rise of the attenuation curves at the limits of the transmission range are already known in various forms, for instance in the form of chains of coils and condensers in series or parallel connection in the longitudinal and transverse members or in both, bridge arrangements with oscillatory circuits in the individual branches, and the like. For increasing the steepness of the attenuation curve at the limits of the transmission range it is already known to connect such filters in mesh either directly or through the agency of a repeater.

My invention proceeds along a new path. According to my invention the individual partial filters of a wave filter composed of two or more partial filters possess equal or substantially equal center of transmission range and multiresonant resonance curves and analogous or equivalent construction, and the pairs of input terminals and output terminals of the partial filters are connected in parallel or in series, partially with alternately opposed polarity of the pairs of terminals of one side of the partial filters. By "center of the transmission range" I mean the geometrical center between the limits of the transmission range.

Filters connected in parallel at their input and output pairs of terminals are per se already known as separating filters. In these separating filters the individual filters possess different centers of transmission range, however. It is impossible to solve the problem of my invention, viz. to obtain a steep rise at the limits of transmission range, by connecting such filters in parallel. By the parallel connection of the partial filters at the input terminals and parallel connection of the partial filters at the output terminals at equal centers of the transmission range a considerable increase of the steepness at the limits of transmission range is, however, obtained in contradistinction to the separating filters.

The filter curve of these wave filters depends upon the poling of the connected partial filters.

There are already known filters which consist of the combination of a plurality of members with single-resonant resonance curve, the individual members being connected to the common output with opposite poles, whereby the total connection receives a resonance curve with approximately rectangular course.

My invention starts with partial filters with multiresonant resonance curve, preferably of substantially rectangular shape, the combination of which to a wave filter, particularly when the partial filters are connected with alternately opposite poling, brings about a considerable improvement of the rectangular shape of the resonance curve or steepening of the attenuation curve at the limits of transmission range.

When using a plurality of analogously constructed partial filters with transmission ranges of different extent at least one partial filter of the wave filter is according to my invention so combined with one or more partial filters in such a manner that they would neutralize themselves in their action if they had an equal transmission range and attenuation and wave resistance course. This combination takes place in such a manner that the partial filters in case of connection to one another in the manner stated (input terminal pairs in parallel or in series and output terminal pairs in series or in parallel) are on one side alternately oppositely poled.

My invention will now be described with reference to the drawings affixed to my specification and forming part thereof. In the drawings Fig. 26 shows a separating filter, Fig. 27, an arrangement of wave filters according to my invention in a multitransmission system with a plurality of channels.

Figure 1:
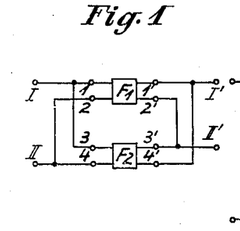
Figs. 1, 1a, 1b, 2, 3a and 3b illustrate various systems of connection of the partial filters for the purpose of constructing a wave filter according to my invention, Fig. 4, a diagram of connections for the partial filters.

Referring to Fig. 1, this shows a filter chain consisting of two partial filters $F_1$ and $F_2$ of analogous construction which are on the one side connected in parallel by their terminals 1, 2, 3, 4 with the conductors I, II and on the other side also in parallel but with reversed poles, by their terminals 1', 2', 3', 4' with the conductors I', II'.

Figure 2:
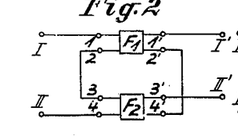

Fig. 2 of the drawings shows a filter chain with two analogous partial filters $F_1$ and $F_2$ which are on the one side connected in series by the pairs of terminals 1, 2 and 3, 4, on the other side connected in series by the pairs of terminals 1', 2' and 3', 4' with reversed polarity.

Figure 3A:
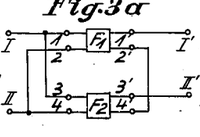

In Fig. 3a of the drawings two partial filters are on the input side (left hand side) connected in parallel, on the output side with opposite poles in series.

Figure 3B:
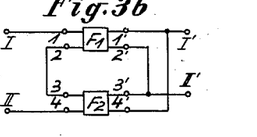

Fig. 3b of the drawings shows the reverse case with series connection at the input side and parallel connection on the output side.

The filters $F_1$ and $F_2$ of the Figs. 1–3b are so constructed that the terminals 1, 2, 1', 2' of the partial filter F, correspond with the terminals 3, 4, 3', 4' of the analogous filter $F_2$. The improved wave filter illustrated in Fig. 1 is symmetrical as well as that shown in Fig. 2, i. e. its input and output wave impedances have the same curve if the individual partial filters themselves are symmetrical. The filter chains shown in Figs. 3a and 3b have, on the other hand, input and output wave impedances, the curve of which, assuming symmetrical partial filters, is reciprocally symmetrical.

Figures 1A, 1B:
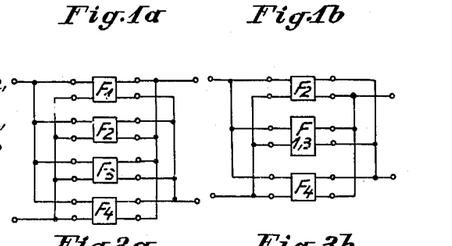

In wave filters with more than two partial filters these filters are on one side continuously alternately poled as Fig. 1a shows for parallel connection at both sides in connection with four partial filters. The connection can, of course, be continued for six and more band filters.

If an even number (greater than two) of partial filters is connected in the manner stated and if two special ones, in the general diagram similarly connected partial filters, are chosen identically equal, these may be electrically replaced by a single partial filter. In this way it is possible to build up a sieve chain of an odd number of band filters. In Fig. 1a of the drawings there is, for instance, shown a wave filter composed of four partial filters $F_1$, $F_2$, $F_3$, $F_4$ connected after the principle shown in Fig. 1, the partial filters on the left being connected in parallel, and these on the right in parallel with reversed poles. By combining the two partial filters $F_1$ and $F_3$, Fig. 1a, into a single one $F_{1,3}$ equivalent to the two, a wave filter with three partial filters is obtained, as shown in Fig. 1b of the drawings.

Figure 4:
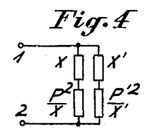

Particularly useful are wave filters which consist of individual band filters at the inputs of which two branches lie parallel which in series connection contain reciprocal impedances. The diagram of these individual partial filters of which the wave filter according to one of the diagrams of connection in Figs. 1, 2, 3a and 3b is composed, is shown in Fig. 4, $x$ and $\dfrac{P^2}{x}$, as well as $x'$ and $\dfrac{P'^2}{x'}$ represent reciprocal impedances which may simply consist of coils or condensers or of a parallel or series connection of such or a converse arrangement. P and P' are then the inversion powers of the reciprocal impedances.

Figure 5A:
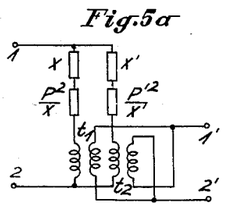
Figs. 5a, 5b, 5c, 6, 7, 8, 9, 10, 11, 12, 13 and 14 show partial filters as used in Figs. 1, 1a, 1b, 2, 3a and 3b, Figs. 15, 16, 17, 18, 19, 20, 21, 24 and 25 show simple constructions of wave filters according to my invention.
Figure 5B:
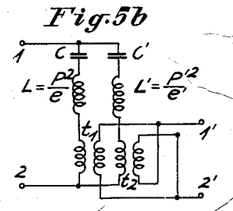
Figure 5C:
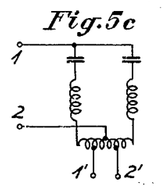
Figure 6:
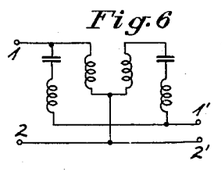
Figure 7:
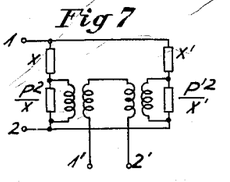
Figure 8:
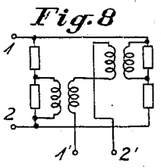
Figure 9:
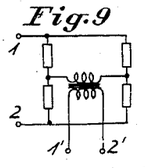
Figure 10:
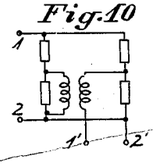
Figure 11:
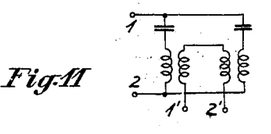
Figure 12:
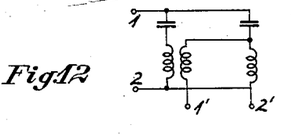
Figure 13:
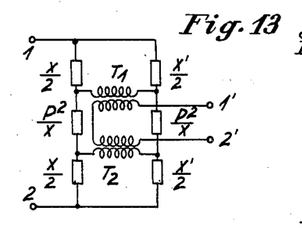
Figure 14:
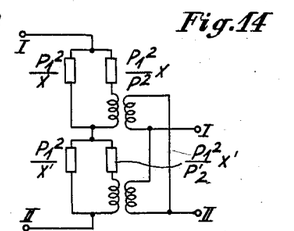

The output of the band filters may be constructed in various manners, as shown by way of example in the construction of Figs. 5a, b, c and 6 to 13. According to Fig. 5a there are connected in the parallel branches current transformers $t_1$ and $t_2$ the secondary windings of which are connected in parallel but with opposite ends. Fig. 5b illustrates the special case in which the reciprocal impedance is formed by the condenser C and the coil L or C' and L' respectively. Instead of the two transformers $t_1$ and $t_2$ an electrically equivalent coil with mid-tap (current difference-autotransformer) may be used, as shown in Fig. 5c. Assuming the ratio of the transformers $t_1$ and $t_2$ as 1:2, the tap of the terminals 1' and 2' of Fig. 5c is located at the ends of the said coil. A band filter electrically equal to Figs. 5b or 5c is obtained if the total voltage of the filter is shifted in phase through an angle of 180° by means of a transformer and the sum of the currents of both branches is supplied to the consumer. This system of connection is shown in Fig. 6. In Fig. 7 of the drawings there is illustrated the case in which in parallel to any two similar impedances of the parallel branches, there are placed the primaries of two transformers, the secondary windings of which are with opposite poles connected in series and connected to the pair of terminals 1' and 2'. If the voltage is tapped from two dissimilar impedances, as shown in Fig. 8, the secondary windings of the transformers are simply connected in series. Fig. 9 shown a partial filter in which at the common points of the impedances in both branches there is connected the primary of a transformer the secondary windings of which lead to the output terminals 1' and 2'. The arrangement is electrically equivalent with Fig. 7, in case the transformers of Fig. 7 possess equal transformation ratios which correspond with that of the transformer in Fig. 9. A mixed form corresponding with Figs. 7 and 9 is shown in Fig. 10 in which in one branch the primary of a transformer is connected in parallel to one impedance and the secondary winding is connected with one pole to the centre or midpoint of the other branch and with the other pole to the terminal 1'. A simple form of the partial filter is shown in Fig. 11, according to which the parallel branches simply consist of a series connection of a condenser and the primary winding of a transformer. The secondary coils of the transformer are oppositely connected in series. Fig. 12 illustrates a modification of the form illustrated in Fig. 10, in which in the second branch a single coil is employed instead of a transformer, and the ends of the secondary of the transformer of the first branch are connected to the centre of the second branch and to the output terminal 1' respectively. The second output terminal 2' is connected to the input terminal 2. A form of the band filter for attaining ground symmetry is illustrated in Fig. 13 of the drawings. The impedances $x$ and $x'$ are subdivided into two parts located at opposite sides of the reciprocal impedances. At the common points of any two corresponding impedances in both branches, the primaries of transformers are connected with the circuit. The secondary windings of these two transformers $T_1$ and $T_2$ are oppositely connected in series. Improved band filters are obtained which are also suitable for the construction of filter chains according to my invention if the reciprocal impedance connections of Figs. 6 to 13 are employed. The transformers employed in the embodiments of my invention mentioned above may in the reciprocal connection again be replaced by transformers if they are assumed to be ideal, i. e., strayless and of infinite transverse impedance. The current transformers pass into potential transformers and vice versa. In Fig. 14 of the drawings there is, for example, shown the band filter reciprocal to the arrangement of Fig. 7. The series connections of the impedances $x$ and $$\frac{P^2}{x}$$

in the first branch of Fig. 7 correspond with a parallel connection of the impedances $$\frac{P_1^2}{x}$$

and $$\frac{P_1^2}{P^2} x,$$

$x$ of Fig. 14, the potential transformer connected in parallel to $$\frac{P^2}{x}$$

in Fig. 7 corresponding with a current transformer connected in series with $$\frac{P_1^2}{P^2}$$

$x$ in Fig. 14. $P_1$ indicates the inversion power when converting the filter according to Fig. 7 into that of Fig. 14, P the inversion powers of the elements of the branch of Fig. 7. A similar conversion into a parallel connection of two impedances takes place in the second branch. The parallel connection of the branches of Fig. 7 corresponds with a series connection of the members corresponding with each branch. The secondary windings of the current transformers are connected in parallel with reversed polarity.

Figure 15:
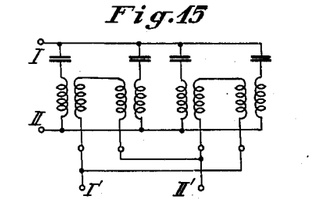
Figure 16:
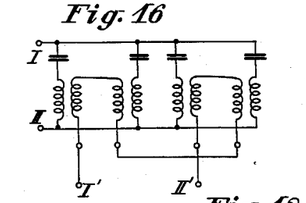
Figure 17:
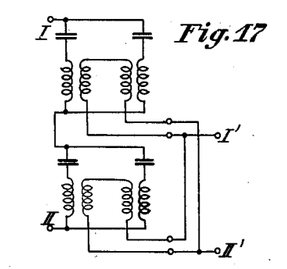
Figure 18:
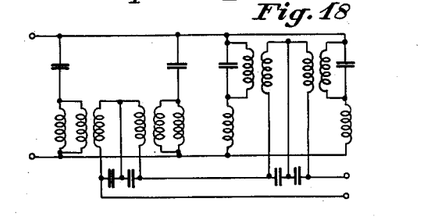
Figure 19:
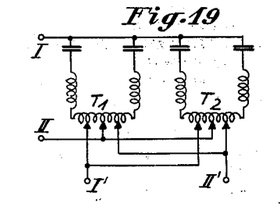
Figure 20:
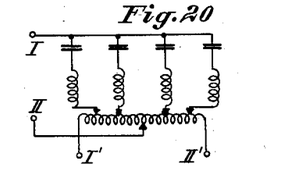
Figure 21:
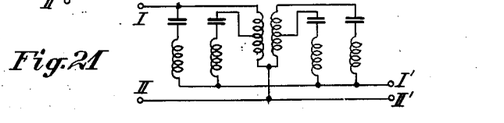

In Fig. 15 there is illustrated a wave filter which has been produced from individual partial filters of the type shown in Fig. 11 according to the diagram of Fig. 1. Fig. 16 illustrates a filter chain of individual partial filters of the type shown in Fig. 11, but connected according to the diagram of Fig. 3. Fig. 17 shows a wave filter composed of the partial filters according to Fig. 11 by arranging the connections according to Fig. 3. Fig. 18 illustrates a wave filter with partial filters according to Fig. 7, with coils and condensers as reciprocal impedances. In the left-hand partial filter the transformers are connected in parallel to the coils, in the right-hand partial filter in parallel to the condensers. In order to obtain a better symmetry of the input and output wave impedance condensers may be connected in parallel to the individual transformers, as shown at the lower portion in Fig. 18 of the drawings. Fig. 19 shows partial filters according to Fig. 5c connected according to Fig. 1. As Fig. 20 shows, the two autotransformers $T_1$ and $T_2$ of Fig. 19 may be replaced by a single one. In Fig. 21 there is illustrated a filter chain which has been produced according to the diagram in Fig. 1 with band filters according to Fig. 6 by combining the two transverse transformers of Fig. 6 into a single one. The properties of the filter chain according to Fig. 16 will now be discussed in greater detail and I shall point out with reference to this example the advantages which result from this kind of connection of the partial filter into a wave filter according to my invention. All the curves referred to hereinafter hold good in the symmetrical form only under the assumption that the width of the transmission range of the partial filters remains small in relation to the center of transmission range.

Figure 22:
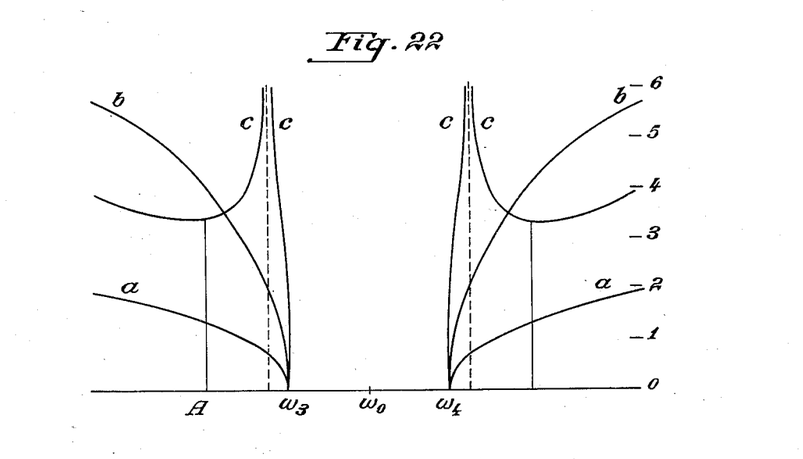
Figs. 22 and 23 show the attenuation curves and apparent impedance curves of wave filters according to the invention.

The attenuation of the partial filter according to Fig. 11 is shown in Fig. 22 by the curve $a$, which is uniform and rather flat. If this filter is combined with another of similar construction with equal transmission frequency but of only half the width of transmission range, as shown in Fig. 16, a wave filter is obtained which has a thrice as steep an attenuation rise as the individual member, see Figure 22 curve $b$. If two equal band filters are simply connected in series the steepness is only doubled with the same expenditure of materials.

It is possible to increase the steepness of the attenuation curve, $b$ in Fig. 22, still further by choosing the ratio of the width of transmission range of both band filters $$\frac{\omega_2-\omega_1}{\omega_4-\omega_3} = \tfrac{1}{2}, \quad \omega_1, \omega_2, \omega_3, \omega_4$$

being the natural frequencies of the individual branches. Attenaution curves are then obtained which possess an infinity point, as curve $c$, Fig. 22 shows. By making the infinity point approach the limits of transmission range the steepness of the attenuation rise at the limits of the transmission range may be about doubled in comparison with the attenuation curve of uniform descent represented at $b$ in Fig. 22. During the still further steepening of the attenuation curve by the approach of the point of infinity to the limit of the transmission range the attenuation minimum beyond the place of infinity, see Fig. 22 at A, drops strongly, however.

Figure 23:
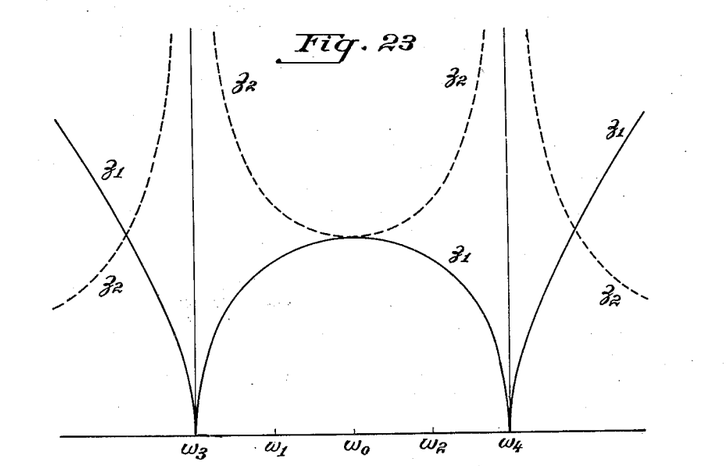

As Fig. 23 shows, the wave impedance characteristic curve of this filter chain is unsymmetrical as regards the input and output. By suitably dimensioning the chain it may, however, be brought about that the two wave impedances of the chain have a reciprocal symmetrical course relatively to one another and at the center of the transmission range possess equal wave impedances for both sides.

The course of the attenuation of a filter chain according to Fig. 19 or of a filter chain formed according to the diagram of Fig. 1 of partial filters according to Fig. 5 is similar to the course of the attenuation of the wave filter according to Fig 16 shown in Fig. 22 curve $b$ or curve $c$ respectively, under the assumption that the width of transmission range is small in comparison with the transmission range frequency.

In this wave filter, Figs. 19, 20 the location of the point of infinity can also be determined by the choice of the widths of the transmission range of the individual partial filters, thereby also varying the steepness at the limits of the transmission range of the wave filter, inasmuch as the steepness rises with the approach of the places of infinity to the limits of the transmission range. But even when the place of infinity is moved into infinity the attenuation rise is in this chain also thrice as steep as that of a single partial filter. The wave impedances of such a sieve chain have, however, in contradistinction to the wave filter according to Fig. 16, on both sides of the same characteristic curve, similar to that of $Z_1$ in Fig. 23.

In both the said filter chains, in the reciprocal symmetrical one, Fig. 16, as well as in the symmetrical, Fig. 19 or 20, the characteristic if the wave impedance is entirely independent of the choice of the width of the transmission range conditions and thus of the steepness of the attenuation curve and the location of the point of infinity.

Figure 24:
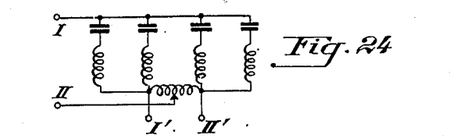

A particular simple form which the filter chains according to Figs. 19 or 20 will assume in case the ratio of the transformers is made 1, is illustrated in Fig. 24. This filter chain consists of four condensers and four coils connected in series with them. A single coil with a tap in the middle replaces the four transformers. The attenuation characteristic corresponds, as already mentioned, with the curve in Fig. 23 with one point of infinity. The steepness or the location of the point of infinity can be predetermined by the choice of the resonance frequencies of the four branches with the series connections of capacities and inductances.

Figure 25:
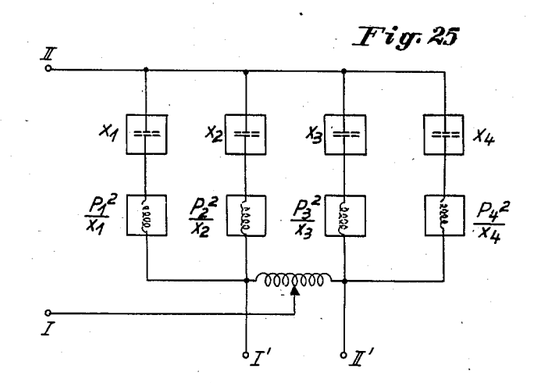

The wave filters according to my invention may with advantage be employed for the construction of separating filter arrangements, a substantial simplification resulting in some types of the wave filters by joining them up. Fig. 25 shows, for instance, the general form of the wave filter illustrated in Fig. 24. The wave filter consists of four branches each with two reciprocal impedances $$x_1 \text{ and } \frac{P_1^2}{x_1}, \quad x_2 \text{ and } \frac{P_2^2}{x_2} \ldots$$

in series, for instance condensers and coils, the branches on one side being connected to the terminal II and on the other side in pairs to the ends of tapped coil A and the pair of terminals I' and II'. The mid-tap of the coil A leads to the second terminal I of the first pair of terminals. The properties of such a wave filter for the special case of the condensers and coils as reciprocal impedances have already been described in detail.

It is per se known in case of multiple utilization of lines, for instance, to connect a number of filter chains in form of separating filters on one side in parallel. If, for instance, the pairs of terminals I' II' of the individual wave filters for individual channels of a multitransmission system are connected in parallel, the same potential always develops at the mid-taps of the coil A of the individual wave filters with different transmission ranges. The individual coils connected in parallel with middle tap may thus according to a further feature of my invention be replaced by a single coil. The coils with middle taps may also be replaced by transformers the windings of which facing the wave filters possess a middle tap.

Figure 26:
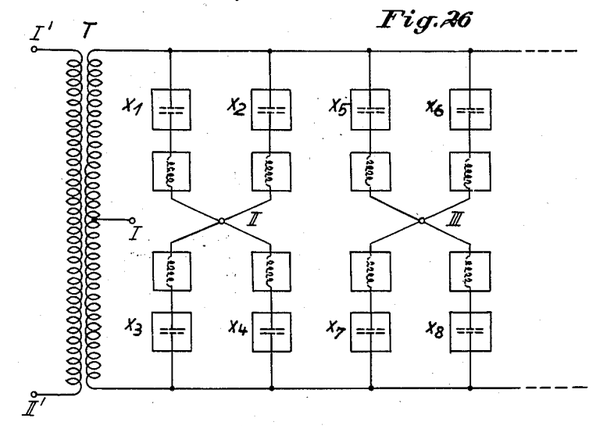

Fig. 26 illustrates by way of example such a construction of the separating filter according to a further feature of my invention. The input terminals I' II' lead to the primary winding of a transformer the secondary winding of which possesses a middle tap connected to the terminal I. The outlet of the separating filter for the first channel is formed by the terminals I and II, the four branches of the first wave filter (consisting of the impedances $x_1$ $x_2$ $x_3$ $x_4$ in series with their reciprocal impedances) being connected to the terminal II. In the simplest case the impedances are formed by capacities and coils, as indicated in broken lines in Fig. 26. The terminals I and III form the outlet for the second channel, the individual branches of the second wave filter being converted to the impedances $x_5$ ... $x_6$. The number of the wave filters thus connected is to be imagined to be continued towards the right as far as desired.

The dimensioning of the elements of the wave filters takes place as described above in such a manner that the individual partial filters possess approximately equal center of transmission range and a multiresonant resonance curve.

In the embodiment of my invention in which the individual transformers of the wave filters are replaced by a common transformer located in the inlet of the separating filter, a considerable saving in elements is attained. Generally speaking no saving can be effected in elements by connecting in parallel wave filters with different transmission ranges, as far as this is possible, but in this special case a saving is possible for the reason that the transformer is not a true element of the filter, i. e. it has no part in determining the properties of the filter.

The separating filter made according to my invention possesses in comparison with separating switches composed of other filters the same advantages as the wave filters described have in comparison with the known filter chains. Over the Campbell filter these have, for instance, the advantage to give at the same expenditure of switch elements attenuation curves of the same order (equally steep rise of the phase angle within the transmission range) but with points of infinity, and thus in general with a steeper characteristic curve.

The separating filter described may equally well be employed at the beginning as at the end of a multiple transmission system.

Figure 27:
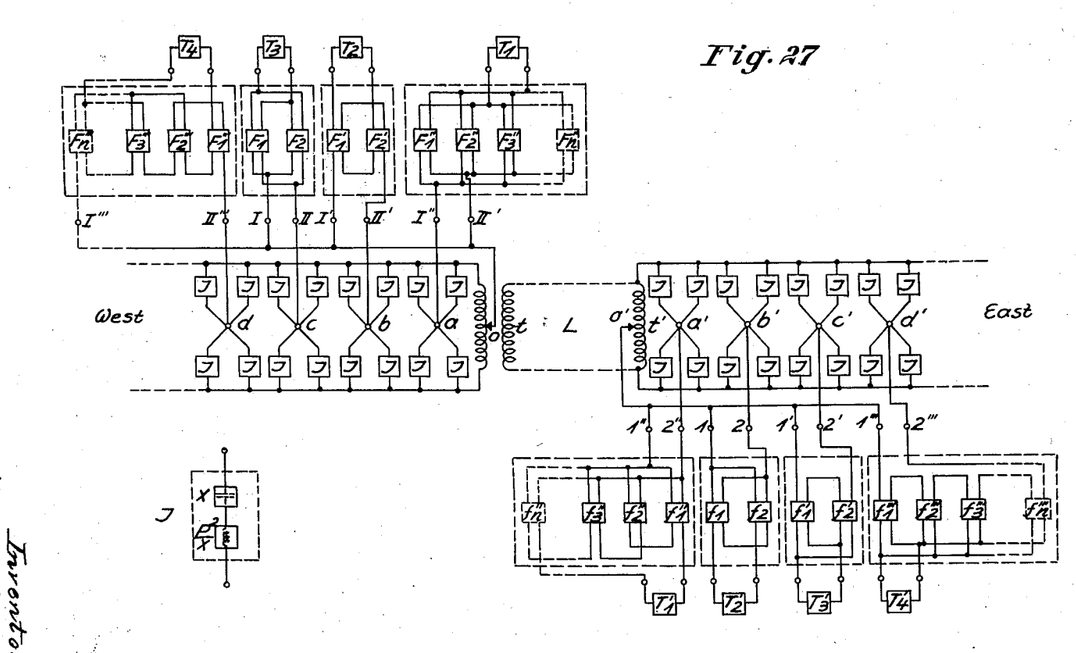

Such a multiple system is illustrated in Fig. 27 of the drawings. To a line L there are connected through transformers $t$ and $t'$ separating filters which separate the currents and lead to the stations $T_1$ ... $T_4$ and $T_1'$ ... $T_4'$ respectively through filters.

To explain this figure the western branch with the stations $T_1$ ... $T_4$ will first be described in detail. The stations $T_1$ ... $T_4$ connected through a frequency channel may contain transmitting and receiving equipment for telegraphy with carrier currents or for telephony or any other signals with modulation and demodulation apparatus. The separating filter connected to the line is constructed like the one shown in Fig. 26 and permits of the currents of the individual channels to be tapped between $o$ and $a$, between $o$ and $b$, between $o$ and $c$ and between $o$ and $d$. The branches diagrammatically illustrated in this figure consists of reciprocal impedances.

The channels separated in the separating filter reach the terminals I II or I' II', I'' II'', I''' II''' to which filters are also connected in order to obtain a more distinct limitation of the channels before they are received at the stations $T_1$ ... $T_4$. The wave filters connected in front of the stations correspond with those in Figs. 1, 1a and 1b and 2 respectively, the filter connected in front of the station $T_4$ consisting of a plurality of partial filters in the form shown in Fig. 2. The partial filters $F_1$ and $F_2$ ... $Fn'''$ are so chosen as to obtain the desired steepness and the transmission ranges corresponding with the channels.

The eastern branch with the stations $T_1'$ ... $T_4'$ is designed in similar manner. The separating filter is connected to the line L through the autotransformer $t'$ with mid-tap at $o'$. The individual channels lead to the terminals of wave filters connected in series. The wave filters shown here correspond with those shown in Fig. 3a and Fig. 3b, the filters connected to the terminals 1'' 2'' and 1''' 2''' being provided with a greater number of partial filters than two in order to bring about a greater steepness of the rise of attenuation for these filters.

The stations $T_1$ and $T_1'$ may operate on the same carrier current channel. This also applies to the other stations indicated by different indices. Between any two cooperating stations the transmission of signals may take place in one direction only or in known manner in both directions. The partial filters of the wave filters employed may preferably be constructed according to one of the Figures 4 to 14.

I claim as my invention:

1. An electric filter arrangement including a separating filter constructed of several wave filters joined at one side and several additional wave filters joined to said separating filter at its other side, said wave filters comprising a plurality of partial filters, the partial filters combined in one wave filter, being so proportioned as to have the same or nearly the same center of transmission range, multiresonant resonance-curves and equal or analogous composition, the input and output of said partial filters being connected, some of them having changed polarity at their input or output sides.

2. In a transmission system for multiple signaling or like transmission purpose a separating filter arrangement, said separating filter arrangement comprising a plurality of wave filters and being associated with the transmitting line common to all the channels by means of a transformer, the primary of which is connected to the output of the line, the secondary of which, supplying energy to several wave-filters, is joined in parallel with said filters, said wave filters being composed of several partial filters, each consisting of two parallel branches, containing two reciprocal impedances joined in series, one of said branches being connected at one end to one end of said secondary, the other of said branches being connected at one of its ends to the other end of said secondary, the other ends of said branches being joined and so associated with the junction point of the branches of analogous partial filters, belonging to the same wave filter of the particular channel, as to form one contact of the output terminals of the separating filter respective to said channel, the other contact being the mid-point of the secondary of said transformer, said partial filters, belonging to the same wave filter, being so proportioned as to have the same or nearly the same center of transmission range, multiresonant resonance-curves and an in- and output joined in parallel, some of them having changed polarity at their input.

3. In a transmission system for multiple signaling or like transmission purpose a separating filter arrangement comprising a plurality of wave filters composed of partial filters, an autotransformer by which said separating filter arrangement is associated with the transmitting line common to all the channels, the terminals of said autotransformer being connected to the output of the line and to the input of said wave filters, each filter consisting of two parallel branches containing two reciprocal impedances joined in series, one of said branches being connected at one end to one end of said autotransformer, the other of said branches being connected at one of its ends to the other end of said autotransformer, the other ends of said branches being joined and so associated with the junction point of the branches of analogous partial filters, belonging to the same wave filter of the particular channel, as to form one contact of the output terminals of the separating filter, with respect to said channel, the other contact being the mid-point of said autotransformer, said partial filter, belonging to the same wave filter, being so proportioned as to have substantially the same center of the transmission range, multiresonant resonance-curves and an in- and output joined in parallel.

4. In a transmission system for multiple signaling or like transmission purpose a separating filter arrangement comprising a plurality of wave filters, a transformer by which said separating filter arrangement is associated with the transmitting line common to all the channels, the primary of said transformer being connected to the output of the line, while its secondary, which supplies energy to several wave filters, is connected with them in parallel, said wave filters being composed of several partial filters, each consisting of two parallel branches, containing a condenser and a coil joined in series, one of said branches being connected at one end to one end of said secondary, the other of said branches being connected at one of its ends to the other end of said secondary, the other ends of said branches being joined and so associated with the junction point of the branches of analogous partial filters, belonging to the same wave filter of the particular channel as to form one contact of the output terminals of the separating filter, with respect to said channel, the other contact being the mid-point of the secondary of said transformer, said partial filters, belonging to the same wave filter, being so proportioned as to have substantially the same center of transmission range, and an in- and output joined in parallel, some of said partial filters having different polarities at their input, the resonance frequencies of said branches being such that in every wave filter the resonance frequency of those branches which are joined in parallel is alternately the higher and lower one of both resonance frequencies of a partial filter.

5. In a transmission system for multiple signaling or like transmission purpose a separating filter arrangement comprising a plurality of wave filters, an autotransformer by which said separating filter arrangement is associated with the transmitting line common to all the channels, the terminals of said autotransformer being connected respectively to the output of the line and to the input of several wave filters, said wave filters being composed of several partial filters, each consisting of two parallel branches containing a condenser and a coil, joined in series, one of said branches being connected at one end to one end of said autotransformer, the other of said branches being connected at one of its ends to the other end of said autotransformer, the other ends of said branches being joined and so associated with the junction point of the branches of analogous partial filters, belonging to the same wave filter of the particular channel, as to form one contact of the output terminals of the separating filter, with respect to said channel, the other contact being the mid-point of the secondary of said transformer, said particular filters, belonging to the same wave filter, being so proportioned as to have substantially the same center of transmission range, and an in- and output, joined in parallel, some of said partial filters having different polarities at their input, which is effected by choosing the resonance frequency of said branches being such that in every wave filter the resonance frequency of those branches which are joined in parallel is alternately the higher and lower one of both resonance frequencies of a partial filter.

6. A wave filter comprising a plurality of partial filters, the partial filters being so proportioned as to have substantially the same center of transmission range, multi-resonant resonance curves and equal or analogous composition, the input and output of said partial filters being connected, some of them having different polarities at their interconnections.

7. A wave filter comprising a plurality of partial filters, each composed of two parallel branches, and each consisting of two reciprocal impedances in series and being so proportioned as to have substantially the same center of transmission range, multiresonant resonance curves and equal or analogous composition, the input and output of said partial filters being connected, some of them having different polarities at their interconnections.

8. A wave filter comprising a plurality of partial filters, the partial filters being composed of two parallel branches, consisting of two reciprocal impedances and the primary of a transformer joined in series, the secondary of the transformers of both branches being joined in parallel with opposite polarities and connected to the output of the partial filter, the branches of each partial filter being so proportioned that the partial filters have substantially the same center of transmission range, multiresonant resonance curves and equal or analogous composition, the input and output of said partial filters, being connected, some of them having opposite polarities at their interconnections.

9. In a transmission circuit a wave filter comprising a plurality of partial filters, the partial filters being composed of two parallel branches, consisting of two reciprocal impedances and an autotransformer, in series with said impedances and common to both branches, the terminals of said autotransformer being joined to the output of the partial filter, the midpoint of said transformer being connected to one pole of the input and the branches of each partial filter being so proportioned, that the partial filters have substantially the same center of transmission range, multiresonant resonance curves and equal or analogous composition, the input and output of said partial filters being connected, some of said partial filters having different polarities at their interconnections.

10. In a transmission circuit a wave filter comprising a plurality of partial filters, the partial filters being composed of two parallel branches consisting of two reciprocal impedances and one half of an auto-transformer in series, the other half of said transformer being in series with the other branch of the same partial filter, said transformer being common to all the partial filters associated within the wave filter, the terminals of said transformer being joined to the output of the wave filter, the midpoint of said transformer being connected to one pole of the input, the branches of each partial filter being so proportioned, that the partial filters have substantially the same center of transmission range, and multiresonant resonance curves and that some of the partial filters will act with opposite polarities.

11. A wave filter comprising a plurality of partial filters, the said partial filters being composed of two parallel branches, consisting of a condenser, a coil and the primary of a transformer joined in series, the secondary of the transformers of both branches being joined in parallel with opposite polarities and connected to the output of the partial filter, the branches of each partial filter being so proportioned, that the partial filters have substantially the same center of transmission range, multiresonant resonance curves and equal or analogous composition, the input and output of said partial filters being connected, some of said partial filters having opposite polarities at their interconnections.

12. A wave filter comprising a plurality of partial filters said partial filters being composed of two parallel branches, consisting of a condenser, a coil and an autotransformer in series, common to both branches, the terminals of said transformer being joined to the output of the partial filter, the midpoint of the transformer being connected to one pole of the input, the branches of each partial filter being so proportioned that the partial filters have substantially the same center of transmission range, multiresonant resonance curves and equal or analogous composition, the input and output of said partial filters being connected, some of said partial filters having opposite polarities at their interconnections.

13. A wave filter comprising a plurality of partial filters, said partial filters being composed of two parallel branches, consisting of a condenser, a coil and one half of an autotransformer in series, the other half of said transformer being in series with the other branch of the same partial filter, said autotransformer being common to all the partial-filters associated within the wave filter, the terminals of said transformer being joined to the output of the wave filters, the midpoint of said transformer being connected to one pole of the input, the branches of each partial filter being so proportioned, that the partial filters have substantially the same center of transmission range, and multiresonant resonance curves and that some of the partial filters will act with opposite polarities.

14. A wave filter, comprising a plurality of partial filters, the partial filters being composed of two parallel branches, said branches consisting of two reciprocal impedances joined in series, the input voltage being directly supplied to one branch, and the primary of a transformer, the secondary of said transformer supplying the input viltage shifted in phase to the second of said branches, the sum of currents flowing in both branches being supplied to the output of the partial filter, the branches of said partial filters being so proportioned, that the partial filters will have substantially the same center of transmission range, multiresonant resonance curves and equal or analogous composition, the input and output of said partial filters being connected, some of them having opposite polarities at their interconnections.

15. A wave filter, comprising a plurality of partial filters, the partial filters being composed of two parallel branches, said branches consisting of two reciprocal impedances, two transformers the primaries of which are connected in parallel to analogous impedances of said branches, the secondaries of said transformers, being oppositely poled and joined in series, and supplying the output of said partial filter, the branches of each partial filter being so proportioned that the partial filters have substantially the same center of transmission range, multiresonant resonance curves and equal or analogous composition, the input and output of said partial filters being connected, some of them having opposite polarities at their interconnections.

16. A wave filter, comprising a plurality of partial filters, the partial filters being composed of two parallel branches, said branches consisting of two reciprocal impedances, a transformer the primary of which is connected with the midpoints of said branches, the secondary of said transformer supplying the output of the partial filter, the branches of each partial filter being so proportioned that the partial filters have substantially the same center of transmission range, multiresonant resonance curves and equal or analogous composition, the input and output of said partial filters being connected, some of them having opposite polarities at their interconnections.

17. A wave filter, comprising a plurality of partial filters, the partial filters being composed of two parallel branches, said branches consisting of two reciprocal impedances, two transformers the primaries of which are connected in parallel to non-analogous impedances of said branches, the secondaries of said transformers being joined in series at terminals of like polarity, supplying the output of said partial filter, the branches of each partial filter being so proportioned that the partial filters have substantially the same center of transmission range, multiresonant resonance curves and equal or analogous composition, the input and output of said partial filters being connected, some of them having opposite polarities at their interconnections.

18. A wave filter, comprising a plurality of partial filters, the partial filters being composed of two circuits joined in series each of said circuits consisting of two reciprocal impedances joined in parallel, two transformers the primaries of which are connected to both of said circuits, the secondaries of said transformers being connected in parallel and oppositely poled, the primaries of the transformers being in series with analogous impedances, said secondaries supplying the output of the partial filter, the impedance of the partial filters being so proportioned, that the filters have substantially the same center of transmission range, multiresonant resonance curves and equal or analogous composition, the input and output of said partial filters being connected, some of them having opposite polarities at their interconnections.

19. A wave filter, comprising a plurality of partial filters, so constructed as to be symmetrical with reference to the ground, said partial filters consisting of two parallel branches, each of them being composed of three impedances joined in series, the middle one of them being reciprocal to the sum of the others, two transformers the primaries of which connect analogous points between adjacent impedances, the secondaries of said transformers being oppositely poled and joined in series, supplying the output of said partial filter, the impedances of the partial filters being so proportioned, that said filters have substantially the same center of transmission range, multi-resonant resonance curves and equal or analogous composition, the input and output of said partial filters being connected, some of them having opposite polarities at their interconnections.

20. A wave filter, comprising a plurality of partial filters, said partial filters being composed of two parallel branches, one of which consists of a condenser and the primary of a transformer joined in series, the secondaries of said transformers being connected to the midpoint of the second branch, consisting of a condenser and a coil in series, the secondaries of the transformers of both branches being oppositely poled and connected in series, the branches of each partial filter being so proportioned that the partial filters have substantialy the same center of transmission range and multiresonant resonance curves, the input and output of said partial filters being connected, some of them having opposite polarities at their interconnections.

21. A wave filter, comprising a plurality of partial filters, said partial filters consisting of two parallel branches, each of said branches being composed of a condenser and a coil in series, the voltage of the branches in the different partial filters being tapped by joining the primaries of transformers alternately in parallel to the condensers and to the coils, the secondaries of said transformers being oppositely poled in every partial filter and joined in series, the junction points being connected with those of the other partial filters, said junction points and the ends of said secondaries being bridged by condensers, the elements in the branches of each partial filter being so proportioned that the partial filters have substantially the same center of transmission range.

In testimony whereof I affix my signature.

ANDREAS JAUMANN.